(12) United States Patent
Feisthemel (10) Patent No.: US 9,483,958 B1
(45) Date of Patent: Nov. 1, 2016

(54) MAGNETIC WRITING BOARD CHORE CHART

(71) Applicant: James A. Feisthemel, Hudson, OH (US)

(72) Inventor: James A. Feisthemel, Hudson, OH (US)

( * ) Notice: Subject to any disclaimer, the term of this patent is extended or adjusted under 35 U.S.C. 154(b) by 170 days.

(21) Appl. No.: 14/215,017

(22) Filed: Mar. 16, 2014

Related U.S. Application Data (60) Provisional application No. 61/792,070, filed on Mar. 15, 2013.

(51) Int. Cl.
*G09B 19/00* (2006.01)
*B43L 1/00* (2006.01)

(52) U.S. Cl.
CPC ..................... *G09B 19/00* (2013.01)

(58) Field of Classification Search
USPC ....... 434/236, 238, 247, 408, 413, 428, 429; 40/488, 491
See application file for complete search history.

(56) References Cited

U.S. PATENT DOCUMENTS

| | | | | |
|---|---|---|---|---|
| 627,396 A * | 6/1899 | Daly | ............... | B43L 1/04 40/491 |
| 1,099,748 A * | 6/1914 | Hopkins | ............ | B43L 1/04 40/491 |
| 5,163,845 A * | 11/1992 | Blassingame | ...... | B43L 13/005 434/247 |
| 5,409,383 A * | 4/1995 | Mannino | ............ | A45C 15/00 434/408 |
| 5,501,603 A * | 3/1996 | Mueller | ............. | B43L 1/04 40/610 |
| 5,573,405 A * | 11/1996 | Evans | ............ | G09B 29/001 116/325 |
| 5,954,512 A * | 9/1999 | Fruge | ............. | G09B 19/00 434/236 |
| 6,139,331 A * | 10/2000 | Owen | ............ | G09B 29/001 434/408 |
| 6,345,821 B1 * | 2/2002 | Labrot | ............. | A63F 3/04 273/141 R |
| 6,532,691 B2 * | 3/2003 | Carlin | ............. | G09F 11/00 40/490 |
| 6,572,380 B1 * | 6/2003 | Buckley | .......... | G09B 19/00 434/236 |
| 6,618,974 B2 * | 9/2003 | Szalay | ............. | G09F 7/10 40/611.06 |
| 7,243,448 B1 * | 7/2007 | Zuaro | ............. | G09F 7/10 40/488 |
| 7,604,481 B2 * | 10/2009 | Owen | ............ | A47B 97/001 434/408 |
| 7,896,652 B1 * | 3/2011 | Van Balveren | ....... | G09B 1/06 434/236 |
| 7,901,213 B1 * | 3/2011 | Beno | ............... | B43K 23/001 434/408 |
| 8,353,120 B2 * | 1/2013 | Burns | ............. | G09F 7/10 40/486 |
| 8,672,687 B2 * | 3/2014 | Shanbour, II | ........ | B43L 1/00 434/408 |

* cited by examiner

*Primary Examiner* — Kurt Fernstrom
(74) *Attorney, Agent, or Firm* — John D. Gugliotta (57) ABSTRACT

An Improved chore chart assembly consisting of a writable, erasable and rewritable surface capable of removably securing labels to display lists of tasks and chores and a method for creating and displaying lists and tasks. The chore chart assembly further consisting of a drawer capable of holding the labels which are capable of being removably affixed.

4 Claims, 12 Drawing Sheets

MAGNETIC WRITING BOARD CHORE CHART

RELATED APPLICATIONS

The present invention claims benefit of U.S. Provisional Application 61/792,070, filed on Mar. 15, 2013 and incorporated by reference as if fully rewritten herein.

BACKGROUND OF THE INVENTION

1. Field of the Invention

The present invention relates to a system and method for creating and displaying lists and tasks and, more particularly, to a parenting tool in the form of an improved chore chart.

2. Description of the Related Art

Chore charts, also called reward charts, behavior charts, chore calendars, chore lists or task lists, are listings used to track and organize the housework and tasks. The chart can be physical, usually in the form of a template, calendar or printed form, or virtual, in the form of computer generated versions of the same. Such charts are often used as a means by parents to post chores expected of their children.

Different homes have different ways of organizing and implementing a chore system. The simplest device is a basic paper chart affixed to a refrigerator. Such chore charts list household tasks, sometimes one chore chart per child and sometimes a combined list. Since children of different abilities and ages can handle various responsibilities, the chores featured on a chore chart can be segmented by age or ability. Younger children may not responsibly handle complex chores, but may still be able and want to help around the house. Easy chores can be included for younger kids in addition to the organization and division of labor within the living unit, such a tool also helps instill the good habit of responsibility from an early age.

As indicated, the use of various types of motivational devices are known in the prior art. However, improvements are desired that can make the implementation of the listing of the accomplishment of the tasks easier. A desirable feature of a motivational system is that it includes flexibility to meet the family's particular value system. It should also be flexible to allow modification to match the child's changing maturity level. It should allow the parents to clearly identify behaviors that are desired of the child. The motivational system should also include a daily schedule that identifies when the behavior is to occur. The motivation system should provide enjoyable rewards to reinforce desirable behaviors and provide negative incentives to discourage undesirable behaviors. To be most effective, the motivational system should allow the child to have some choice in the rewards received.

A primary object of the present invention is to provide a motivation system for children that will overcome the shortcomings of the prior art devices.

Another object is to provide a motivation system for children that is flexible to meet any family value system.

Yet another object is to provide a motivation system for children that allows for identifying a schedule of behaviors and amounts of play money to be received for successful completion of each behavior.

Another object is to provide a motivation system for children that includes a board constructed with a dry ink writable and erasable surface, thereby allowing flexibility to make changes easily.

A further object is to provide such a surface that is magnetic for use in conjunction with a label set or kit that allows customizable or standard list items to be used, attached or removed.

Yet another object is to provide a motivation system for children that can be easily mounted and used on an indoor vertical surface of the home, such as a refrigerator door.

A further object is to provide a motivation system for children that is fun, simple, and easy to use.

A still further object is to provide a motivation system for children that is economical to manufacture.

Further objects and advantages of the invention will become apparent in the course of the following description.

BRIEF DESCRIPTION OF THE DRAWINGS

The advantages and features of the present invention will becomes better understood with reference to the following more detailed description and claims taken in conjunction with the accompanying drawings, in which like elements are identifies with like symbols and in which:

DESCRIPTION OF THE PREFERRED EMBODIMENTS

The best mode for carrying out the invention is presented in terms of its preferred embodiment, herein depicted within the Figures.

1. Detailed Description of the Figures

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 1:
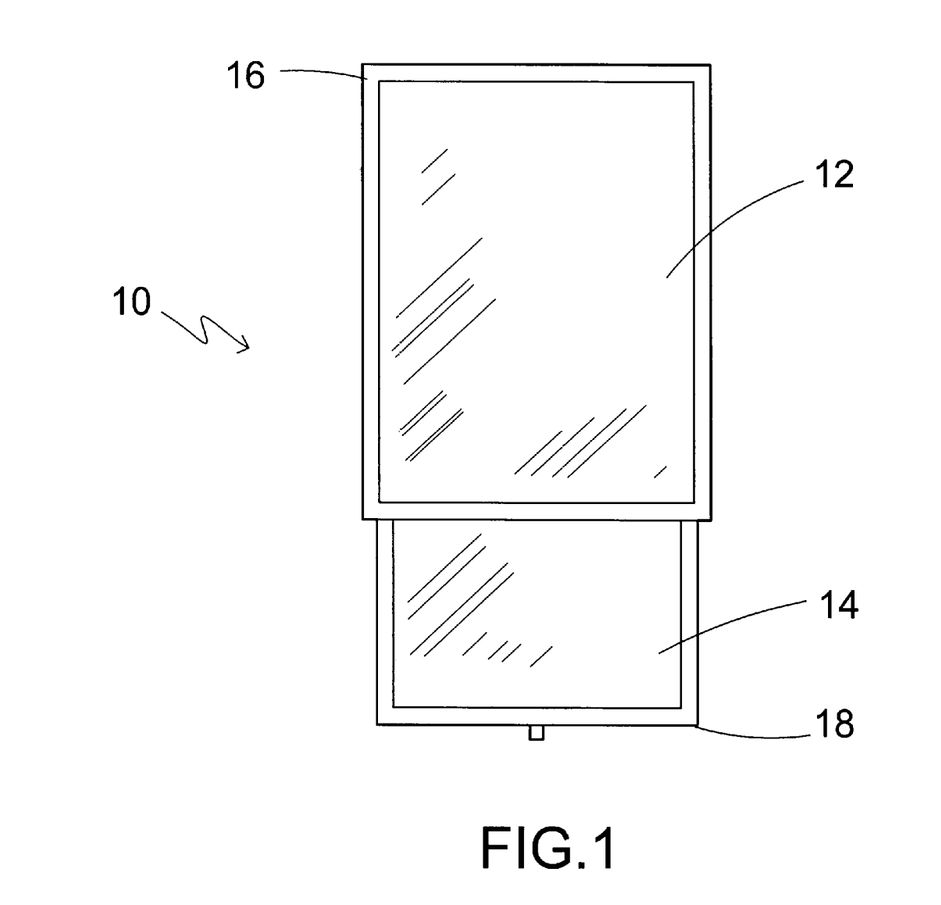
FIG. 1 is a top plan view of a magnetic writing board chore chart according to the preferred embodiment of the present invention.

Referring now to the drawings, wherein like reference numerals indicate the same parts throughout the several views, FIG. 1 depicts a chore chart 10, shown according to the preferred embodiment of the present invention having an outer writing surface 12 into which nests an inner drawer 14. The outer writing surface 12 has a writing board constructed with a surface capable of being written on, erased, and rewritten on, such as a dry ink or chalkboard surface, thereby allowing flexibility to make changes easily. The outer writing surface 12 is further capable of removably securing a label through means such as magnets, Velcro®, non-permanent adhesive and others known by those experience in the art. The outer writing surface 12 is circumscribed by an outer frame 16.

Figure 2:
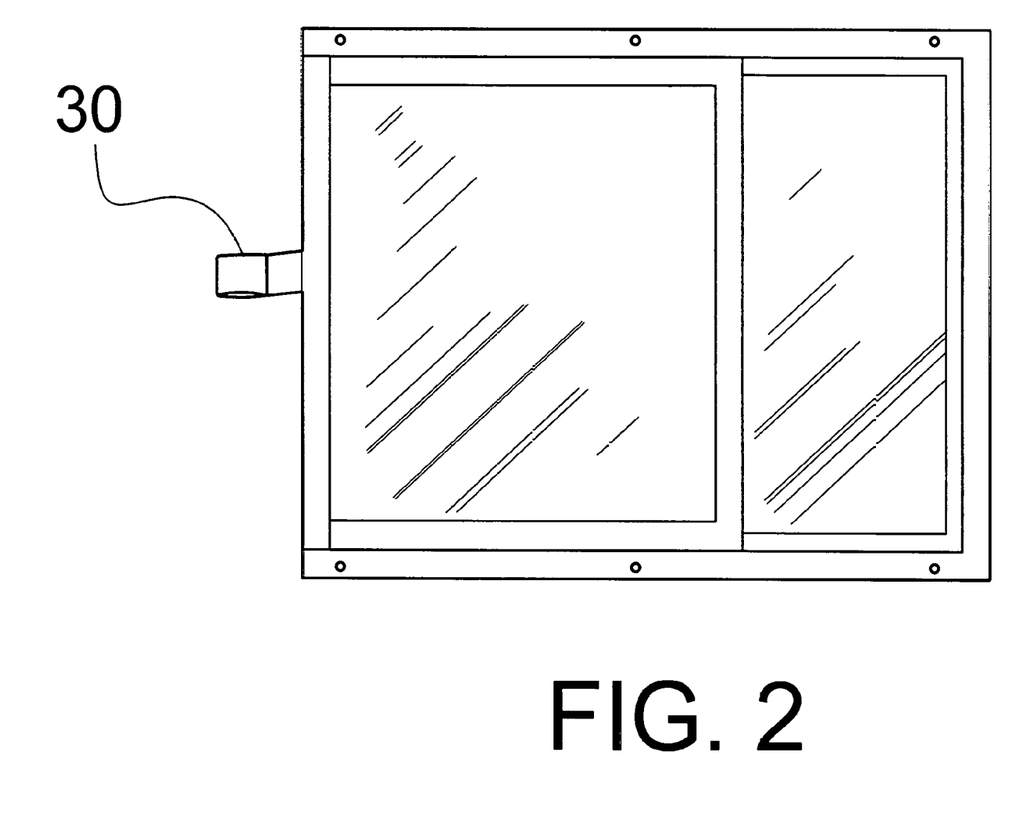
FIG. 2 is a bottom plan view thereof.

As best shown in conjunction with FIG. 2, the inner drawer 14 is further circumscribed by an inner frame 18 that is nestingly received within the outer frame 16 in a manner that allows for extension out from and refraction into and beneath the outer writing surface 12 and is further ferromagnetic or otherwise capable of supporting and storing unused magnetic labels as will be described in greater detail below.

Figure 3:
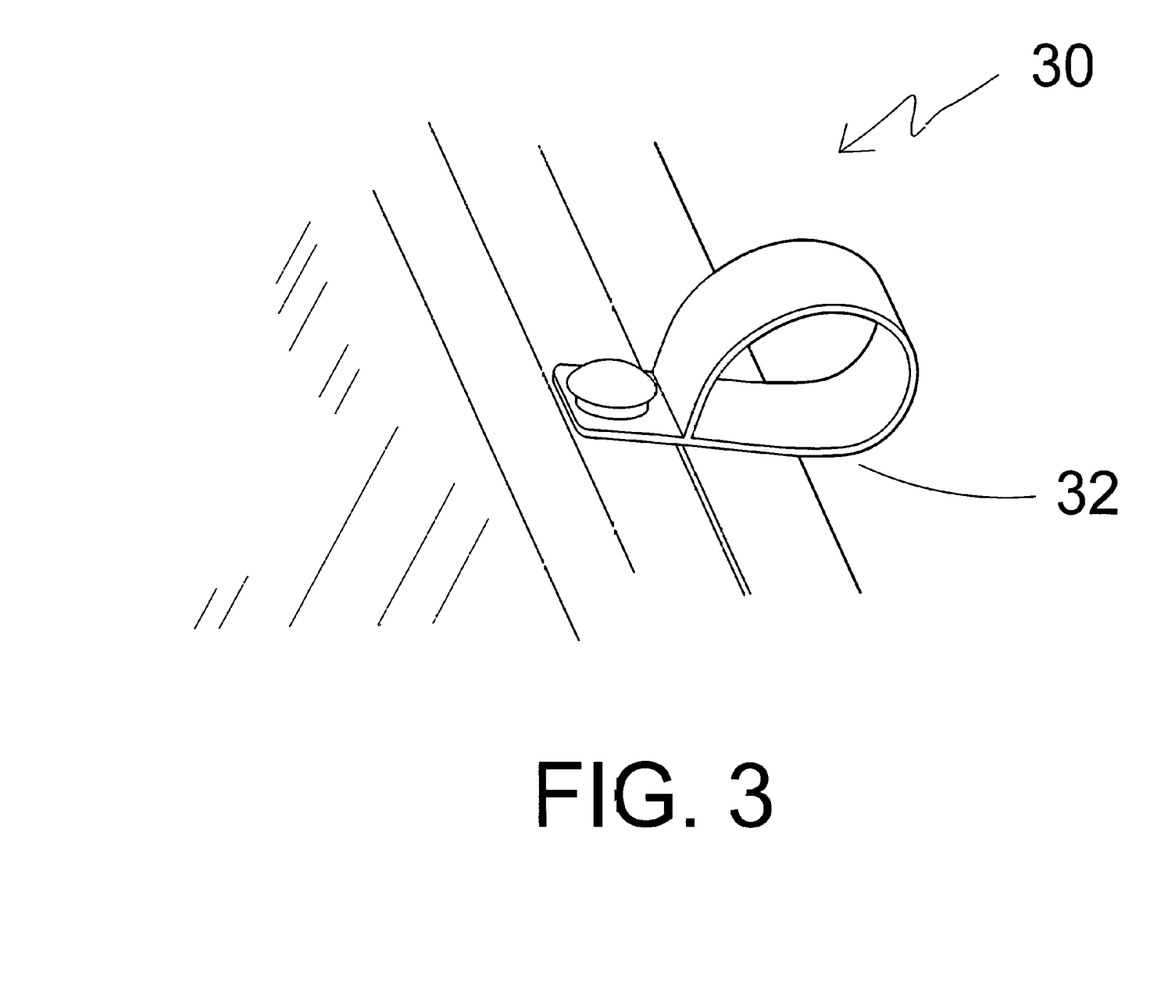
FIG. 3 is a partial perspective view of a pull mechanism for use in conjunction with a preferred embodiment of the present invention.

The entire chore chart assembly 10 is intended to be used independently of computers, or attachment to refrigerators or bulletin board devices or the like. As such inner drawer 14 is hidden behind the outer the outer writing surface 12. The preferred embodiment has a pull mechanism 30 that is provided to allow access to the drawer. As best shown in conjunction with FIG. 3, in one embodiment the pull mechanism 30 is formed as a webbing loop 32 to allow for easy manual access. The loop fastener material may be such that when used with a hook fastener affixed to the inner frame 18, the inner drawer 14 will be stopped from extending too far.

Figure 4:
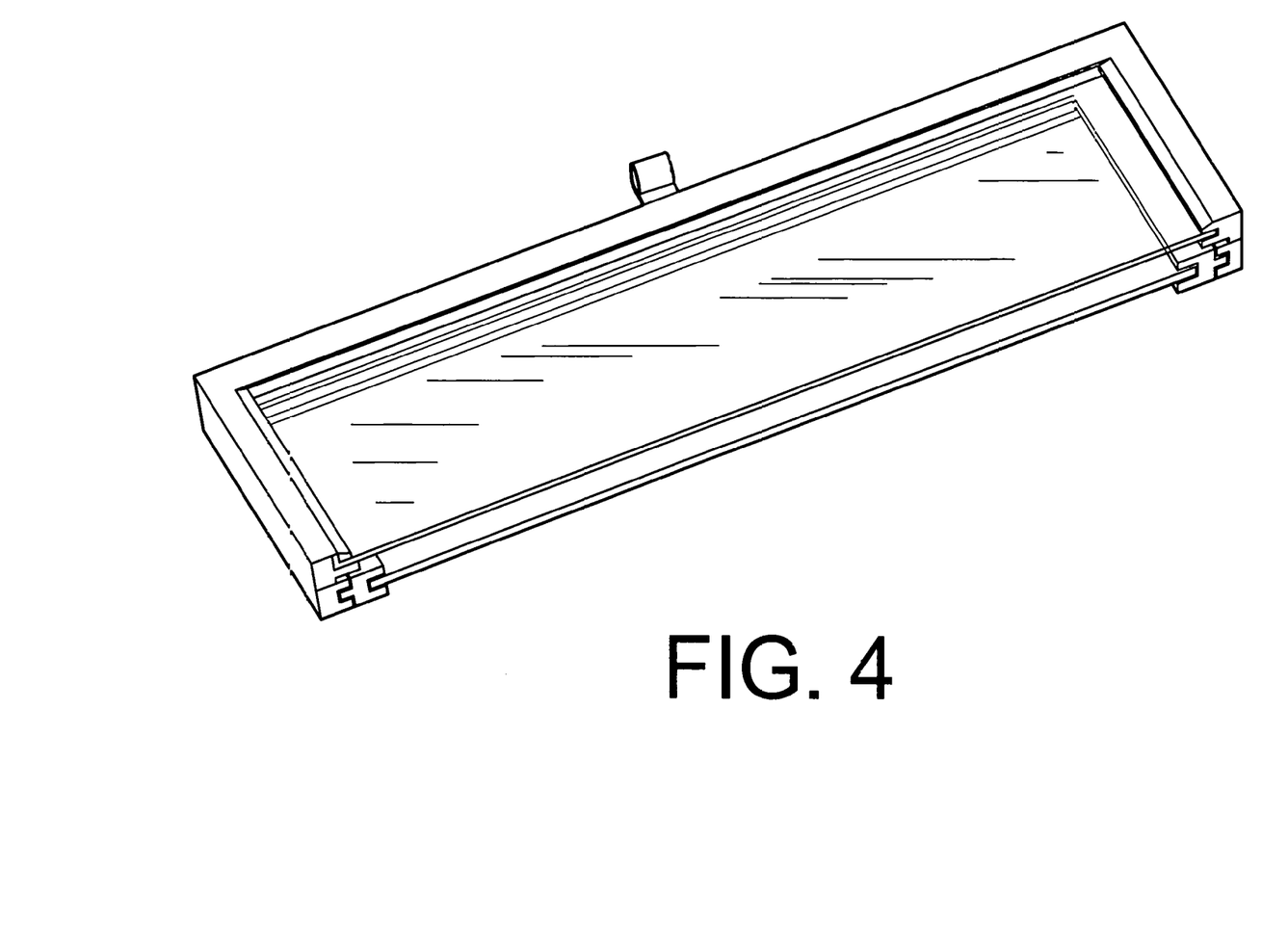
FIG. 4 is a perspective cutaway view of FIG 1.
Figure 5:
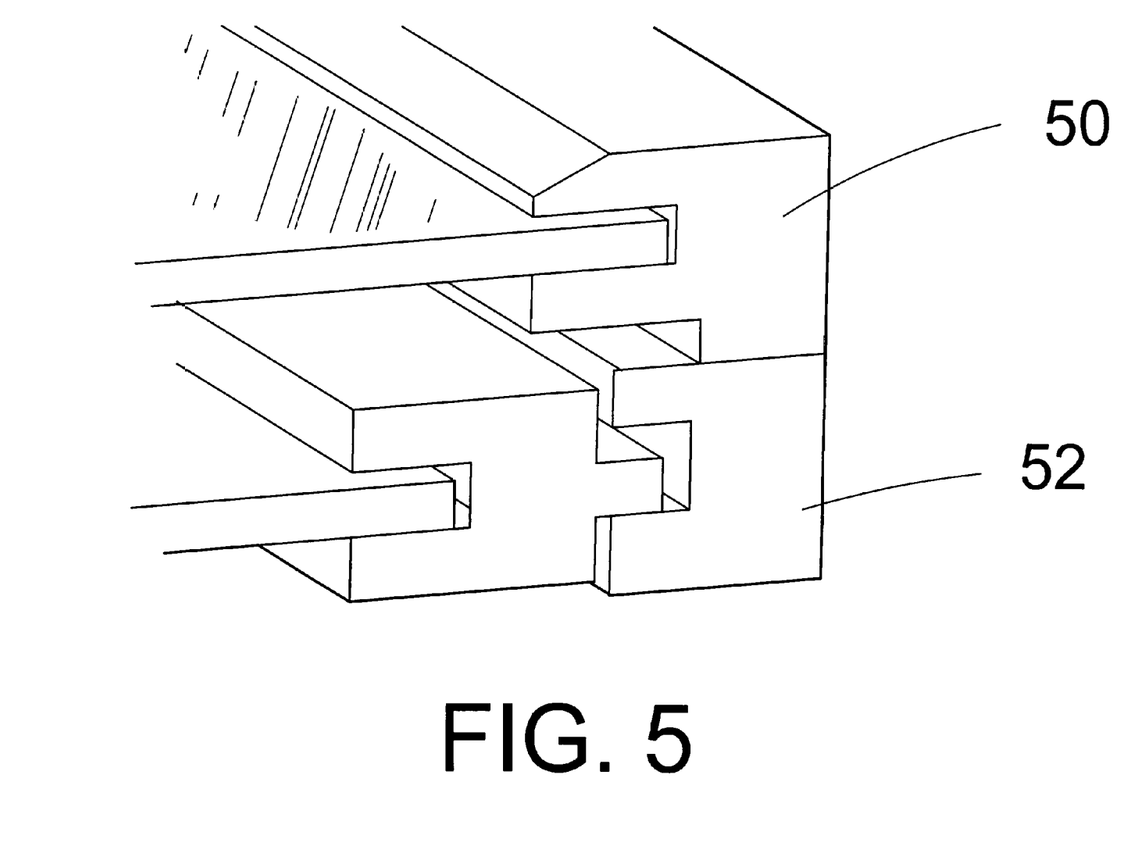
FIG. 5 is a partial detailed perspective cross-sectional view of FIG. 4.
Figure 6:
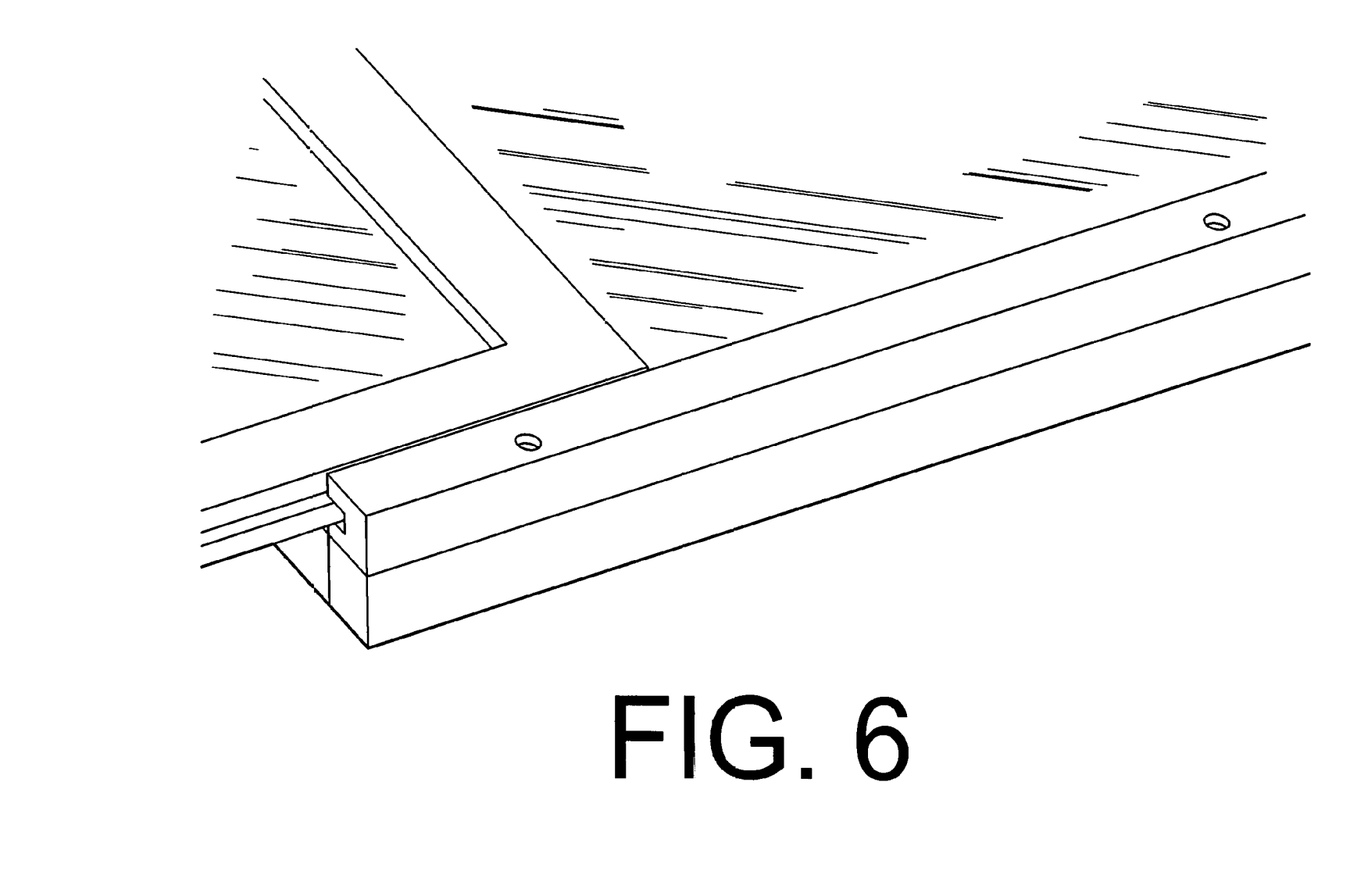
FIG. 6 is a partial detailed bottom perspective cross-sectional view of FIG. 4.

The detailed construction of the outer writing surface 12 and inner drawer 14, as well as their nesting and attachment, are best shown in greater detail in FIG. 4 through FIG. 6. The outer frame 16 has a top frame element 50 and a bottom frame element 52 immediately beneath the top frame element 50 and attached thereto into which the inner frame 18 can be slidably retained. The preferred embodiment, as shown in FIG. 5, shows that the bottom frame element 52 is recessed along the axial plane creating a track-like void space 54 and the inner frame 18 fits into the track-like void space 54 allowing the inner frame 13 to slidably extend out from and retract into the outer frame 16. It has been found that recess amount of approximately 1 mm provides sufficient clearance to allow for free extension and retraction without excess tolerance. However, as should be apparent to a person having ordinary skill in the relevant art, in light of the present teachings, the presence of this recess, and not the specific amount or dimension, is a key component of the present teachings, and the preferred dimension of 1 mm is merely an exemplary design choice.

Figure 7:
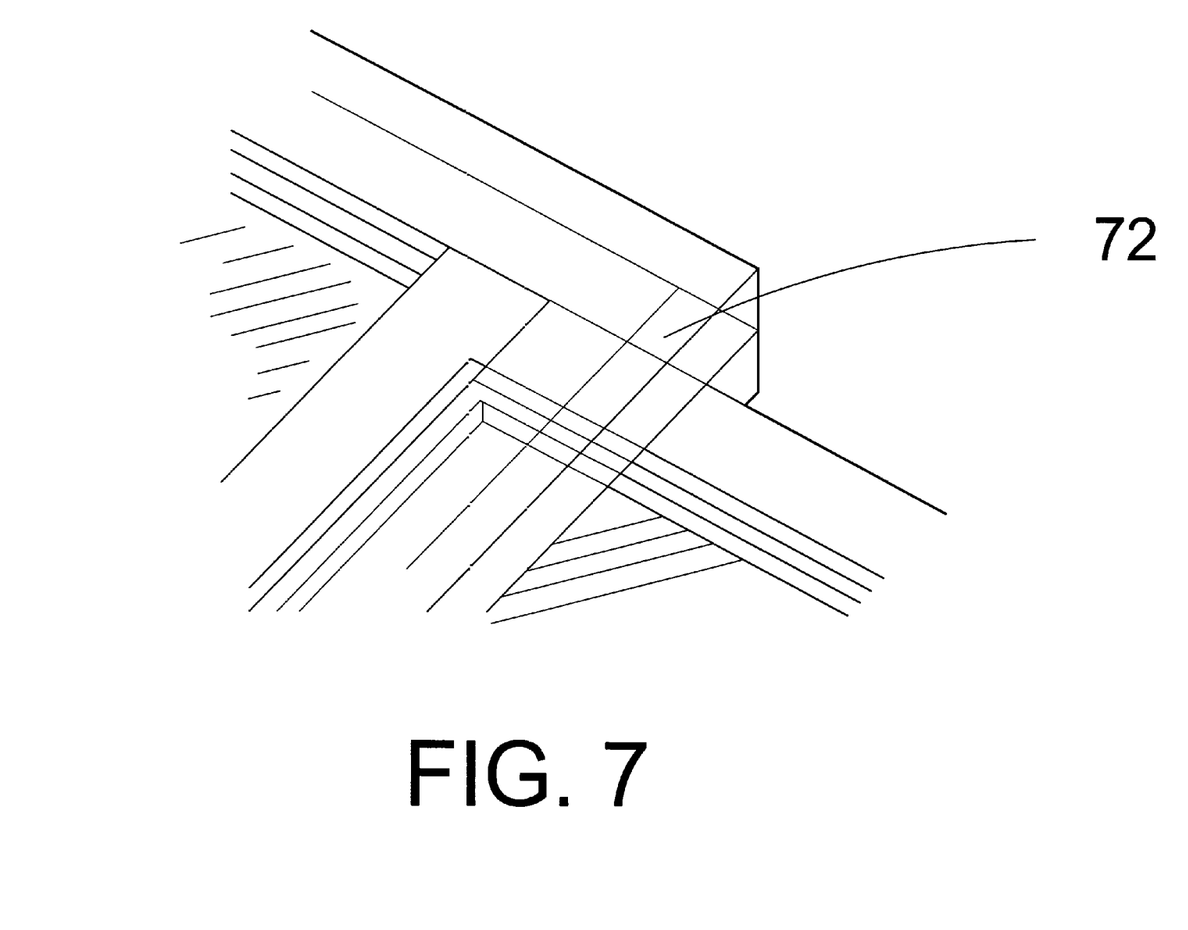
FIG. 7 is a partial exploded perspective view of a stopper construction embodiment of FIG. 2.
Figure 8:
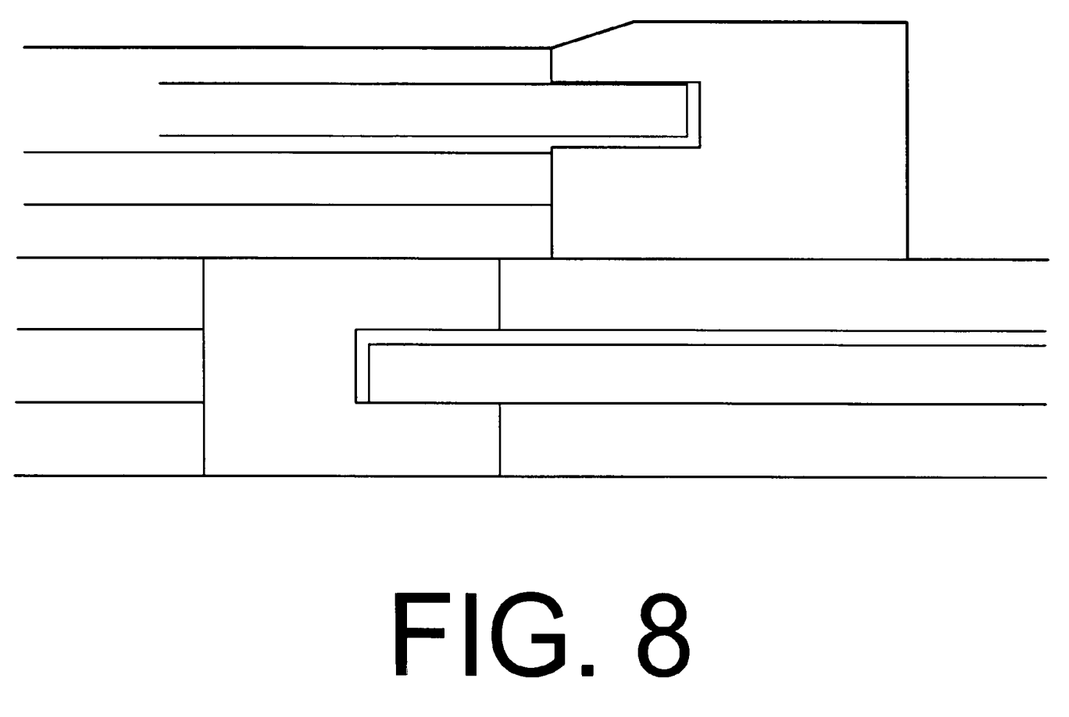
FIG. 8 is a partial cross-sectional view of FIG. 7.
Figure 9A:
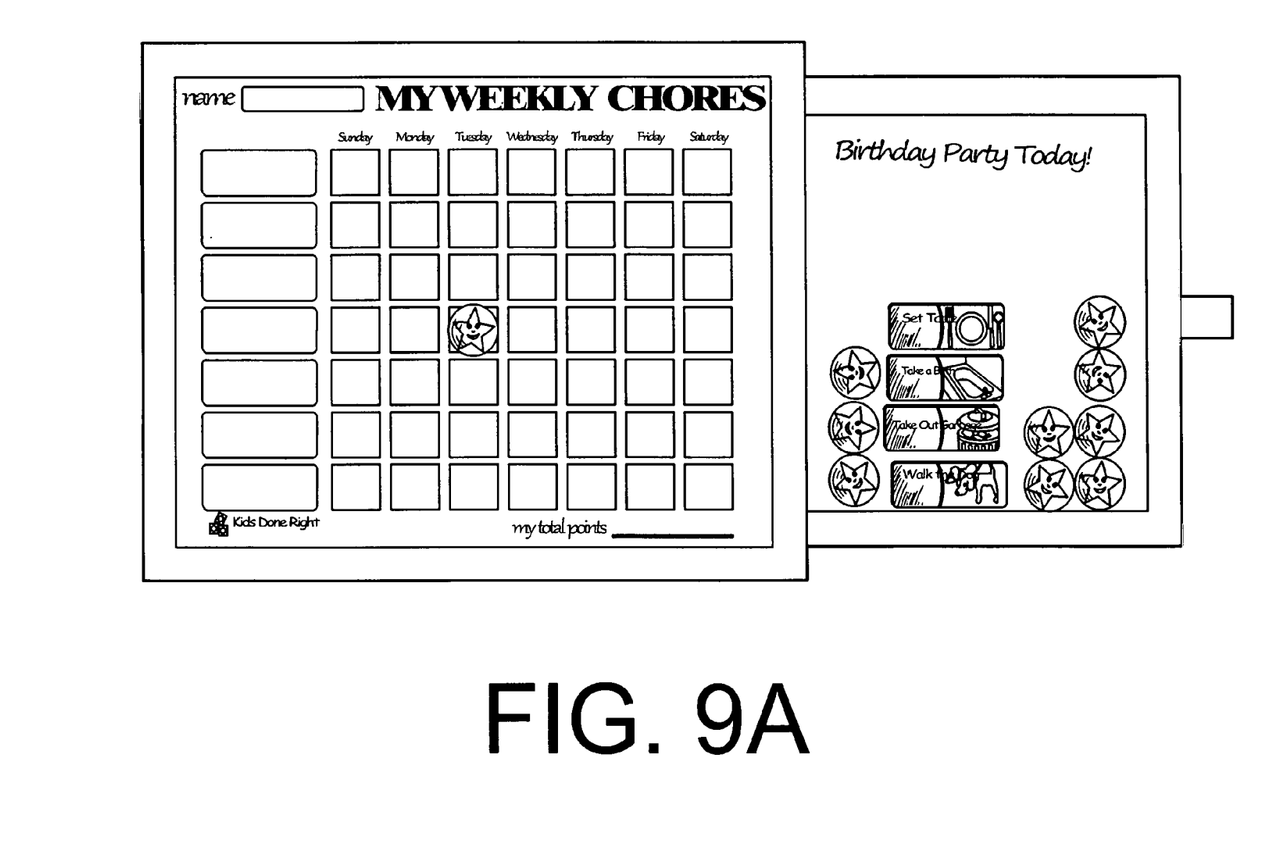
FIG. 9*a* and FIG. 9*b* are perspective views shown open and closed, respectively, of a magnetic writing board chore chart according to the preferred embodiment of the present invention shown in operation.
Figure 9B:
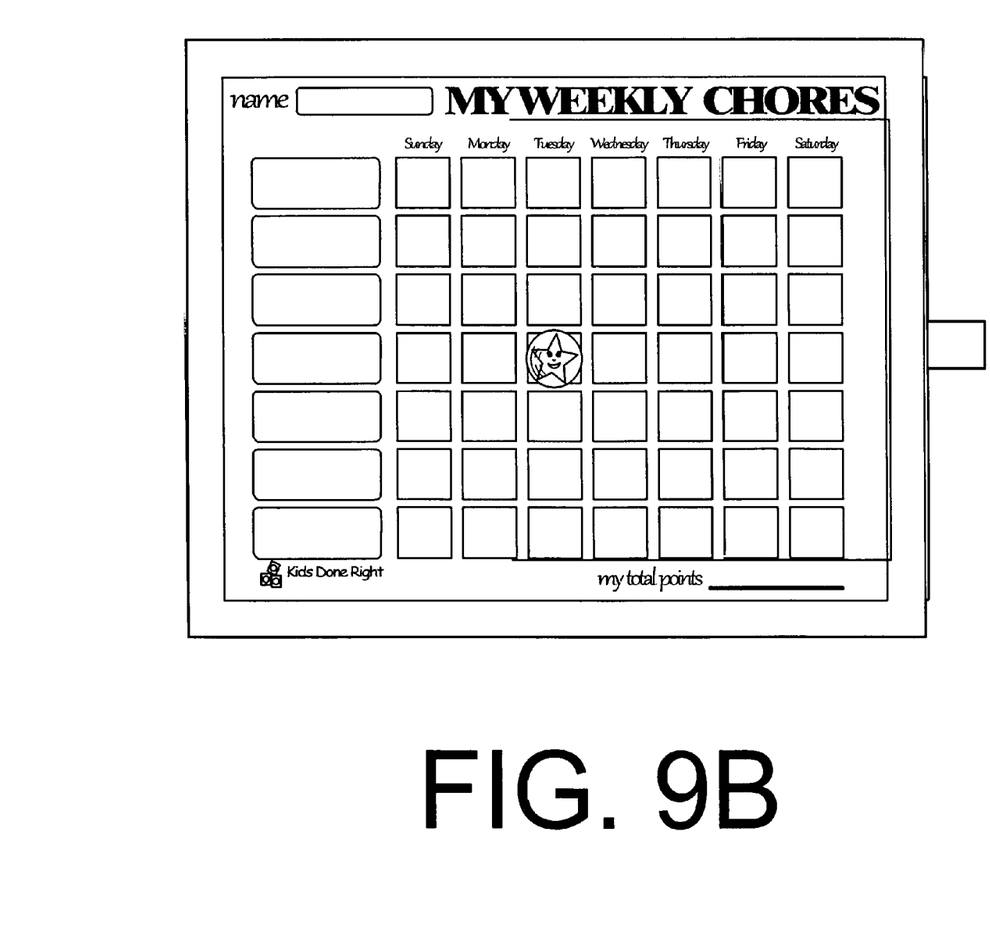
Figure 10:
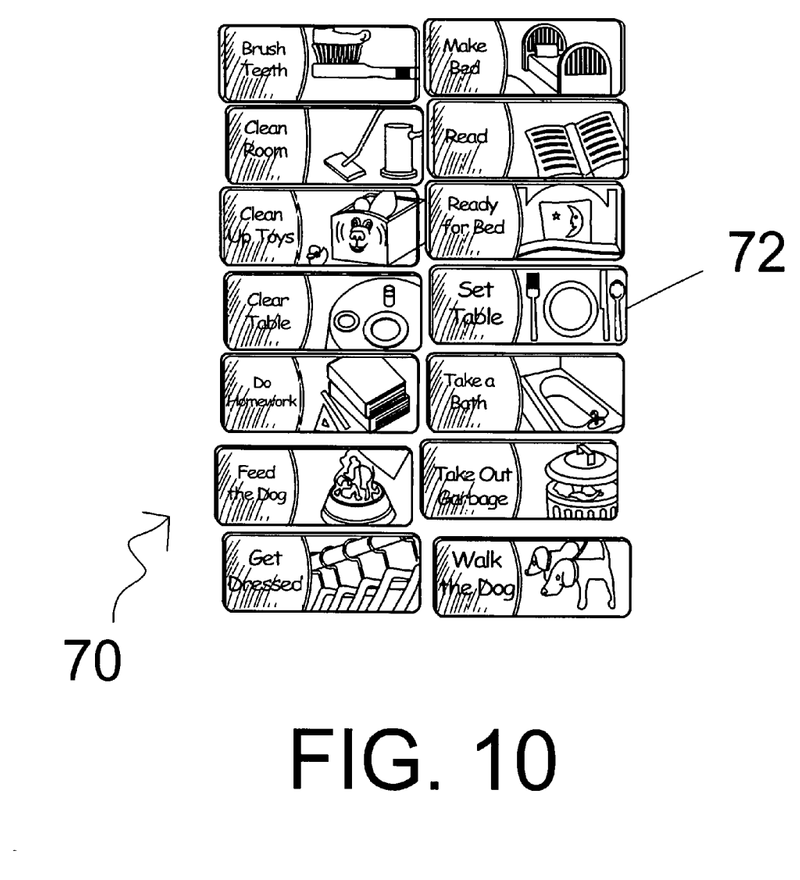
FIG. 10 and FIG. 11 are plan views showing an exemplary label set or kit for use with the magnetic writing board chore chart according to the preferred embodiment of the present invention shown in operation.
Figure 11:
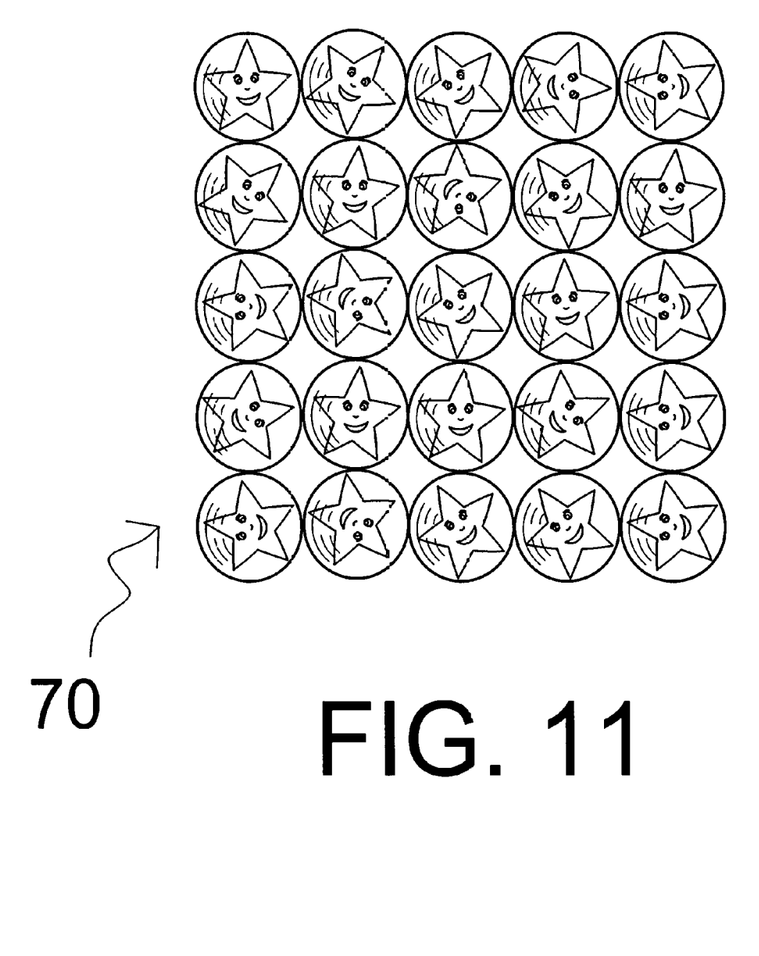

FIG. 7 and FIG. 8 show further detailed construction of the stopper mechanism 70 which prevents the inner drawer 18 from completely releasing its nested. As shown, an impingement element 72 of a wedge shape is affixed to the inner frame 18 and allows for the inner drawer 14 to slide out without wholly being removed.

2. Operation of the Preferred Embodiment

In operation as best shown in conjunction with FIG. 9a, FIG 9b, FIG. 10, and FIG. 11, the magnetic writing board shore chart 10 of the present invention is intended to be used in conjunction with a label set or kit 80 is intended to be available in combination with the chore chart 10. In one embodiment of the invention, the label set 80 provides a plurality of magnetic labels 82 that can be customized with names or specific chores or task. It is intended that blank labels can further be used to allow the users to customize specific names, tasks, or the like. In such a combination, the labels can be affixed or arranged in a coordinated and organized fashion. Those unused labels or labels associated with completed tasks can be stored by attaching to and storing within the inner drawer 14.

The foregoing description of specific embodiments of the present invention are presented for purposes of illustration and description. They are not intended to be exhaustive nor to limit the invention to precise forms disclosed and, obviously, many modifications and variations are possible in light of the above teaching. The embodiments were chosen and described in order to best explain the principles of the invention and its practical application, to thereby enable others skilled in the art to best utilize the invention and its various embodiments with various modifications as are suited to the particular use contemplated. It is intended that a scope of the invention be defined by the Claims appended hereto and their equivalents. Therefore, the scope of the invention is to be limited only by the following claims.

What is claimed is:

1. A device for organizing tasks and chores comprising:
   an outer writing surface, wherein said outer writing surface is circumscribed by an outer frame;
   an inner drawer nested within and behind the outer writing, surface, wherein said inner drawer further comprises an inner writable surface circumscribed by an inner frame; and
   a plurality of labels capable of removably selectively securing to said outer writing surface and further alternately stored within said inner drawer when not secured to said outer writing surface; wherein said plurality of labels include outer indicia to identify required tasks, corresponding responsible persons and completion of tasks.

2. The device for organizing tasks and chores of claim 1, wherein each said plurality of labels is adapted to be securable to said writing surface through means consisting of: magnets; hook and loop fasteners; and non-permanent adhesive.

3. The device for organizing tasks and chores of claim 1, wherein said inner drawer is hidden behind the outer the outer writing surface when fully nested, and further comprising:
   a pull mechanism allow access to the inner drawer; and
   a stopper mechanism which prevents the inner drawer from completely releasing its nested position within said outer writing surface.

4. The device for organizing tasks and chores of claim 3, wherein said stopper mechanism comprises an impingement element of a wedge shape affixed to the inner frame and thereby allow for the inner drawer to slide out without wholly being removed.

* * * * *